US005598637A

United States Patent [19]

Liu

[11] Patent Number: 5,598,637

[45] Date of Patent: Feb. 4, 1997

[54] AUXILIARY RULE OF TILE CUTTER

[76] Inventor: Wun-Hui Liu, No. 2, Jiann Guon Lane, Jiunn Guon Li, Taichung, Taiwan

[21] Appl. No.: 317,639

[22] Filed: Oct. 3, 1994

[51] Int. Cl.$^{6}$ .......... G01B 3/04; B28D 1/32

[52] U.S. Cl. .......... 33/526; 33/478; 125/23.01

[58] Field of Search .......... 33/474, 475, 476, 33/477, 478, 480, 481, 526, 527, 465, 496, 497, 459; 83/468; 225/96.5, 104; 125/23.01, 23.02

[56] References Cited

U.S. PATENT DOCUMENTS

| | | | |
|---|---|---|---|
| 281,761 | 7/1883 | Green | 33/480 |
| 556,840 | 3/1896 | Biggs | 33/478 |
| 3,805,397 | 4/1974 | Wilamowski | 33/478 |
| 4,378,782 | 4/1983 | Richard et al. | 125/23 T |
| 4,420,891 | 12/1983 | Orem | 33/476 |
| 5,169,045 | 12/1992 | Liu | 225/96.5 |
| 5,353,509 | 10/1994 | Black | 33/478 |
| 5,367,783 | 11/1994 | Nyrgen | 33/478 |

FOREIGN PATENT DOCUMENTS

| | | | |
|---|---|---|---|
| 592345 | 4/1994 | European Pat. Off. | 125/23.01 |
| 946897 | 6/1949 | France | 125/23.02 |
| 3702239 | 8/1988 | Germany | 125/23.02 |

*Primary Examiner*—Thomas B. Will
*Attorney, Agent, or Firm*—Browdy and Neimark

[57] ABSTRACT

An auxiliary rule of the tile cutter has a body provided centrally and axially with a long slot. The body is further provided at one end thereof with an arm portion perpendicular to the body which is further provided with a connection portion. The arm portion is fastened detachably at one end thereof with the connection portion such that the arm portion can be coupled in reverse with the connection portion so as to facilitate the use of the auxiliary rule by a left-hander or a right-hander.

10 Claims, 11 Drawing Sheets

AUXILIARY RULE OF TILE CUTTER

FIELD OF THE INVENTION

The present invention relates generally to a tile cutter, and more particularly to an auxiliary rule of the tile cutter.

BACKGROUND OF THE INVENTION

As shown in FIG. 1, an auxiliary rule 10 of the prior art tile cutter is of an L-shaped construction and has a body 11 which is provided centrally along the direction of a longitudinal axis thereof with an elongate slot 12. The body 11 has an arm portion 13 extending vertically from the left end thereof. The arm portion 13 is provided on the right side thereof with a datum line 14 perpendicular to the longitudinal axis of the body 11. The auxiliary rule 10 is disposed pivotally in a long slot 16 of a gauge 15 by means of the body 11 and a bolt 17. The gauge surfaces located at the upper and the lower sides of the slot 16 are provided respectively with a scale. In operation, the bolt 17 is first loosened so as to adjust the position of the auxiliary rule 10. The tile which is intended to be cut is disposed such that the upper side of the tile is rested against the lower side of the gauge 15, and that the left side of the tile is rested against the datum line 14 of the arm portion 13 of the auxiliary rule 10. The cutting dimension of the tile is adjusted appropriately before the bolt 17 is tightened again. The operator uses his or her right hand to hold the tile 18 while he or she is doing the cutting with his or her left hand with which the grip rod 19 is pushed. As shown in FIG. 2, when the tile cutting device is used by a right-handed operator, the arm portion of the auxiliary rule should be located at the right side so as to facilitate the operator to push the grip rod with his or her right hand and to hold the tile with his or her left hand. It is conceivable that a tile cutter can sell better if it were equipped with an auxiliary rule suitable for use by both right-handers and left-handers.

SUMMARY OF THE INVENTION

It is therefore the primary objective of the present invention to provide a tile cutter with an improved auxiliary rule which is designed for use by a left-handed operator or a right-handed operator.

In keeping with the principle of the present invention, the foregoing objective of the present invention is attained by an auxiliary rule, which has a body provided centrally and axially with a long slot. The body is further provided at one end thereof with an arm portion perpendicular to the body which is further provided with a connection portion. The arm portion is fastened detachably at one end thereof with the connection portion such that the arm portion can be coupled in reverse with the connection portion. The auxiliary rule can be therefore used by a left-hander or a right-hander.

DETAILED DESCRIPTION OF THE INVENTION

Figure 3:
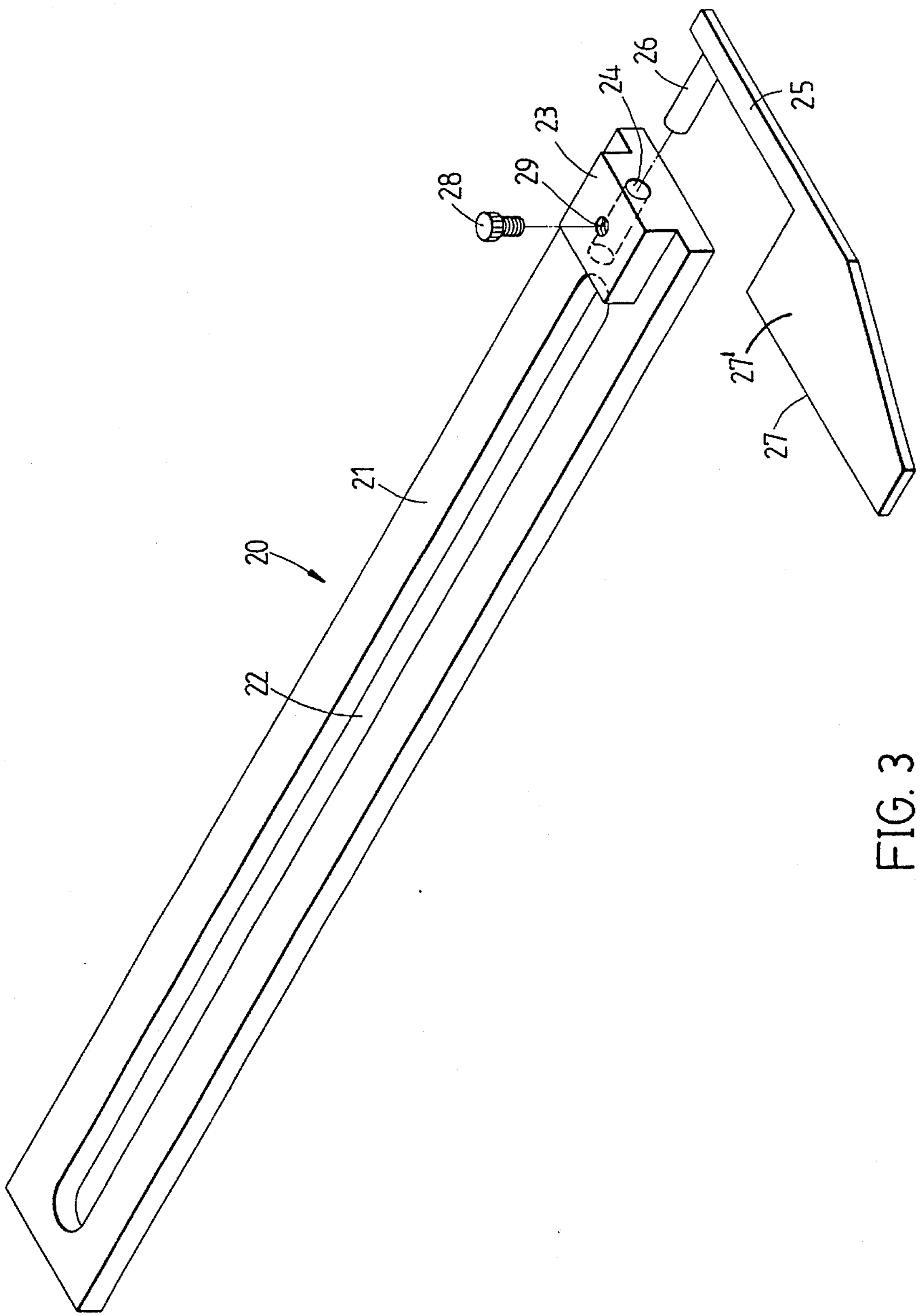
FIG. 3 shows an exploded view of a first preferred embodiment of the present invention.

As shown in FIG. 3, an auxiliary rule 20 of the first preferred embodiment of the present invention comprises the component parts described hereinafter.

A body 21 of a long platelike construction is provided centrally and axially with a long slot 22.

A connection portion 23 is disposed protuberantly at one end of the body 21 and is provided with an insertion hole 24 along the direction of the longitudinal axis of the body 21.

Figure 1:
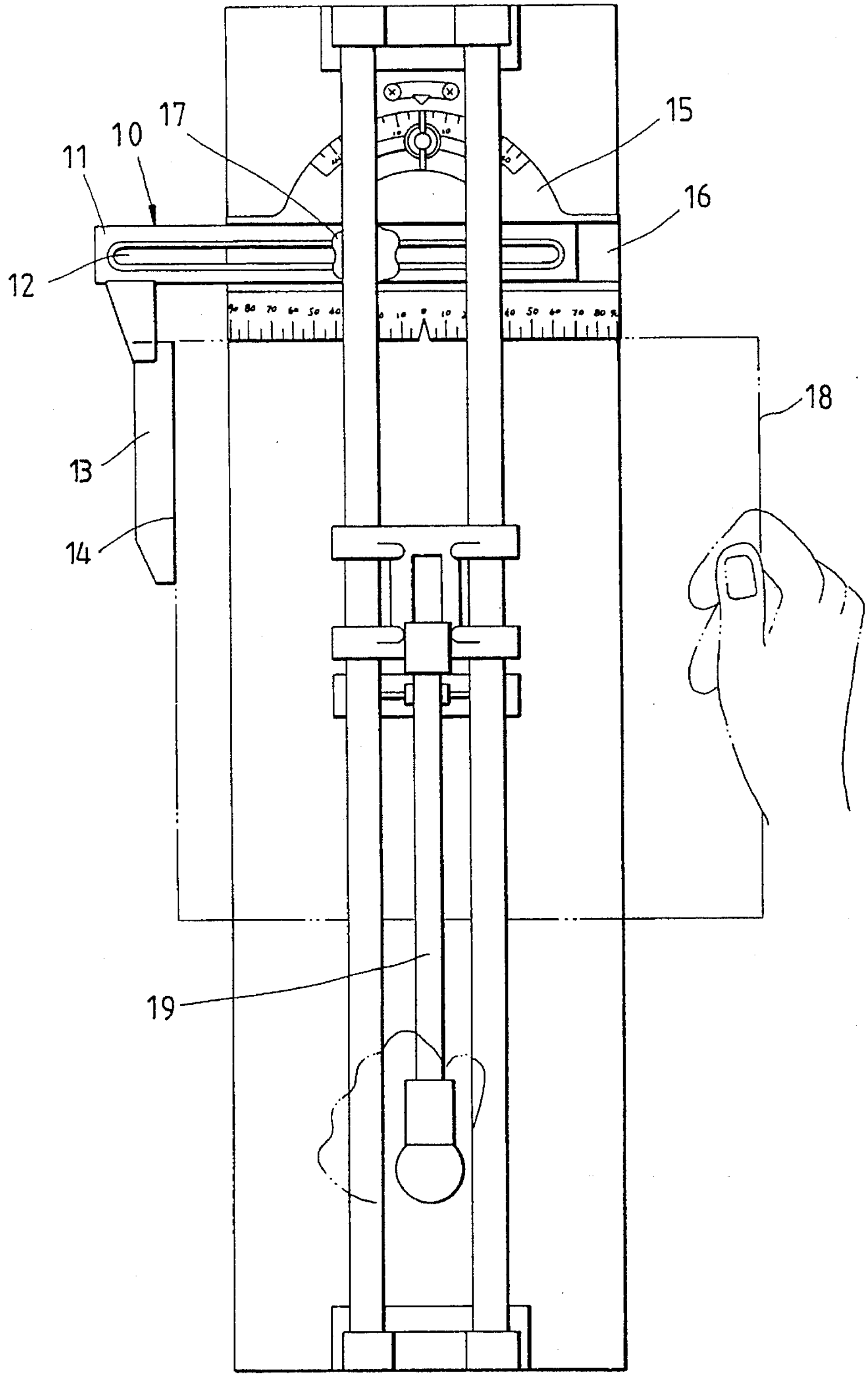
FIG. 1 (PRIOR ART)
FIG. 1 shows a schematic view of a prior art tile cutter for a left-handed operator.
Figure 2:
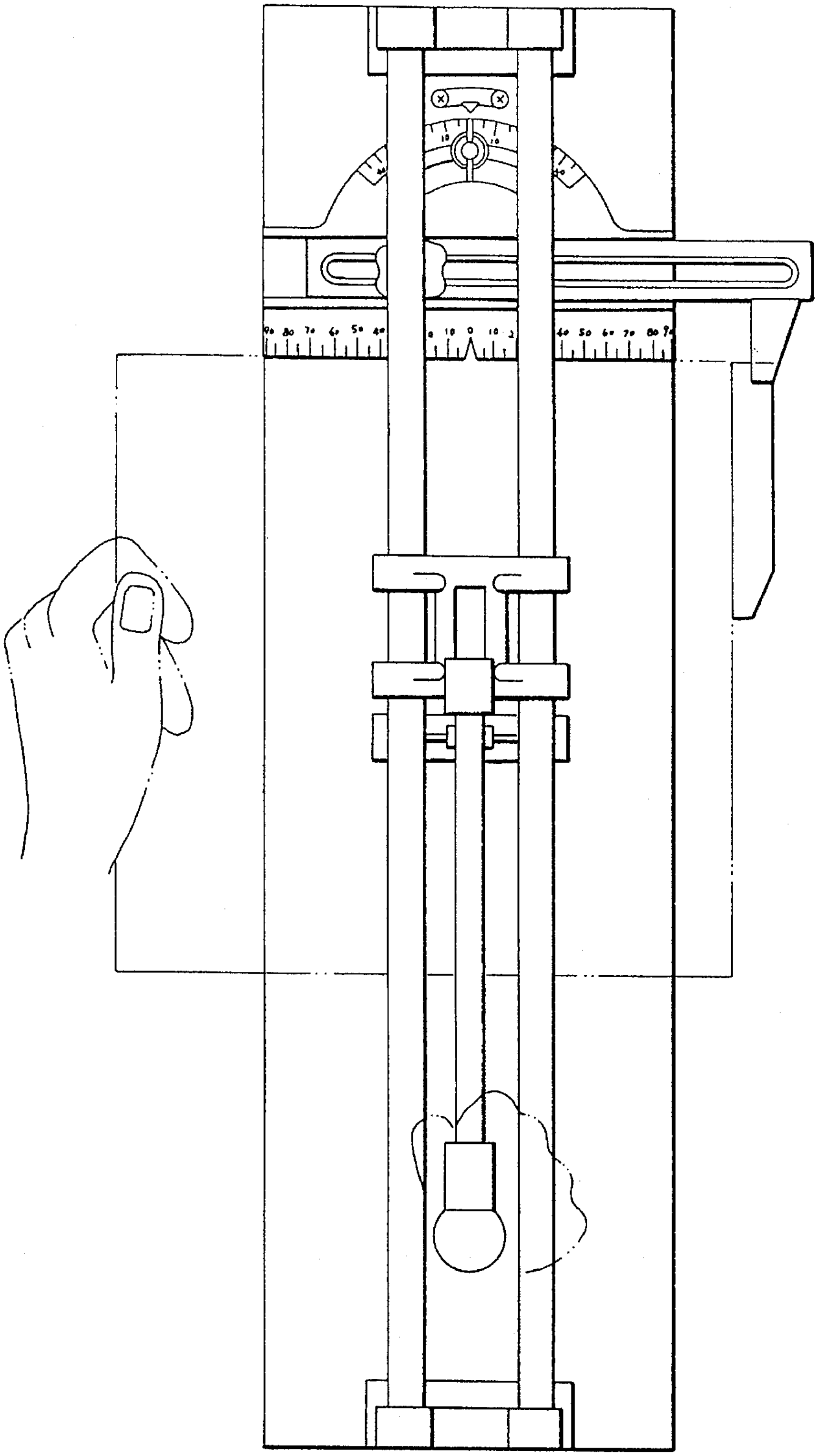
FIG. 2 (PRIOR ART)
FIG. 2 shows a schematic view of a prior art tile cutter for a right-handed operator.

The body 21 is rotatably fixed on a tile cutter in the same manner as that shown in FIGS. 1 and 2, so as to permit the body 21 to be turned so that the connection portion can be located on either the right or left side of the tile cutter.

An arm portion 25 of a long rod-shaped construction is provided at the end of one side thereof with an insertion projection 26 perpendicular to the longitudinal axis of the arm portion 25. Located on said one side of the arm portion 25 is a protruded portion 27' which is located at a predetermined distance from the insertion projection 26. The side surface of the protruded portion is parallel to the longitudinal axis of the arm portion 25 to form a datum surface 27 for locating a tile intended to be cut.

A fastening element 28 is engageable with a threaded hole 29 located in the top surface of the connection portion 23 for fixing the arm portion 25.

Figure 4:
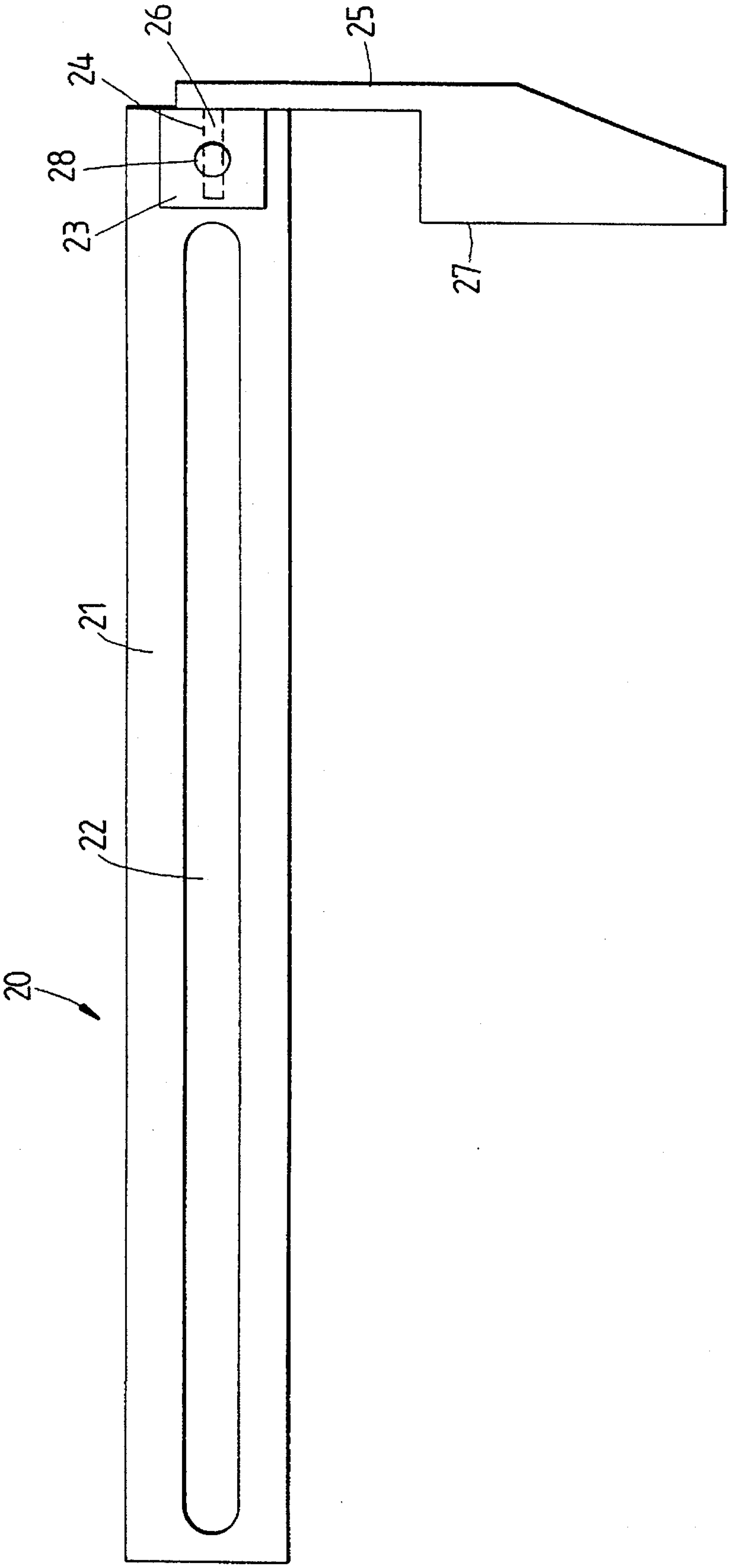
FIG. 4 shows a plan view of the first preferred embodiment in combination, which is provided with an arm portion located at the right according to the present invention.

As shown in FIG. 4, the arm portion 25 is fastened to the right of the body 21 such that the arm portion 25 extends downwards for use by a right-handed operator.

Figure 5:
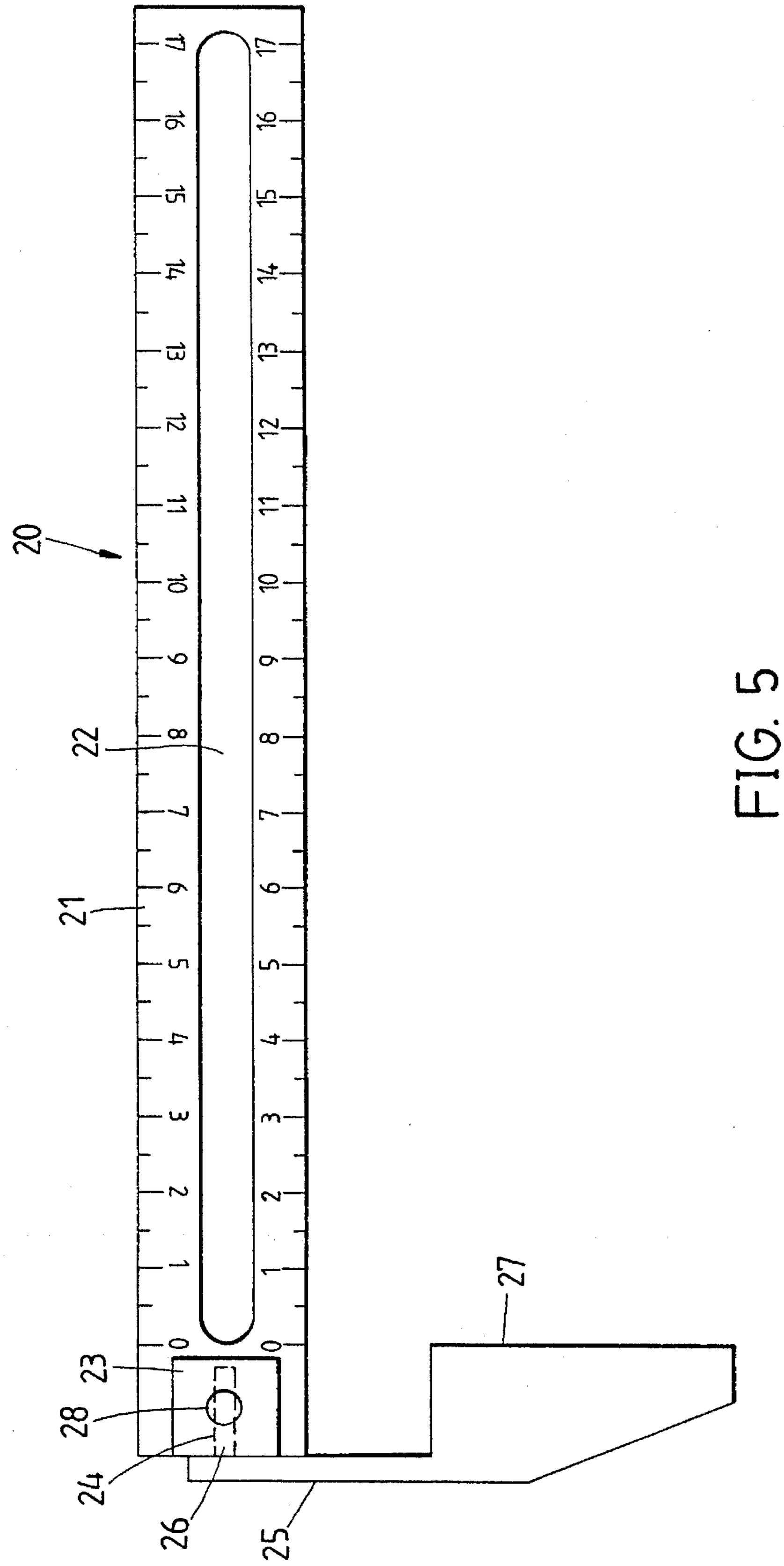
FIG. 5 is similar to FIG. 4, with the exception that the former comprises an arm portion which is located at the left.

As shown in FIG. 5, the fastening element 28 is loosened so as to enable the arm portion 25 to rotate and the body 21 is turned around such that the connection portion 23 is located at the left of FIG. 5. The arm portion 25 is then rotated for 180 degrees so that the arm portion 25 is located downwards, as shown in FIG. 5. Upon tightening the fastening element 28, the auxiliary rule 20 is ready for use by a left-hander.

Figure 6:
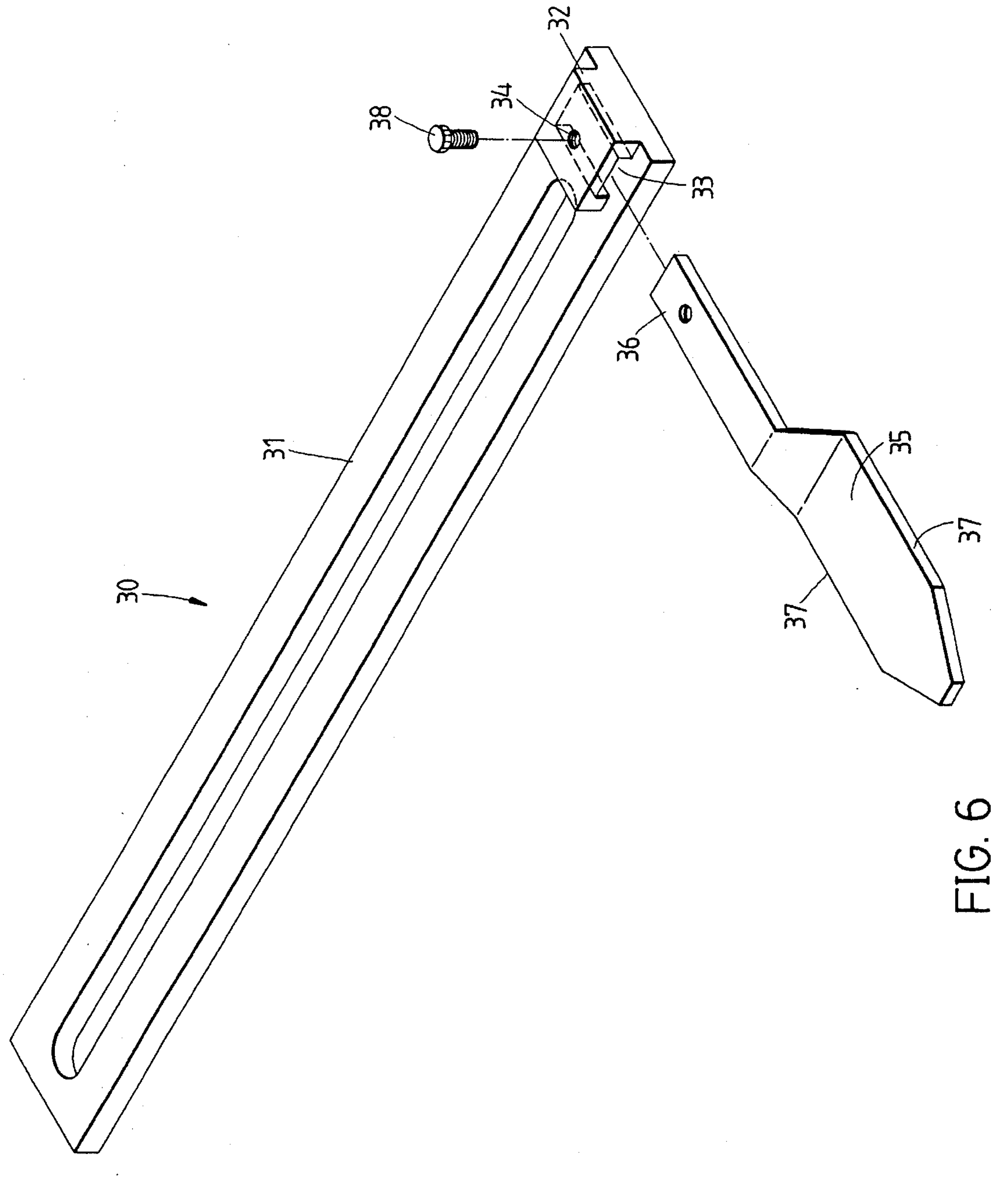
FIG. 6 shows an exploded view of a second preferred embodiment of the present invention.

Now referring to FIG. 6, an auxiliary rule 30 of the second preferred embodiment of the present invention is shown comprising the component parts described hereinafter.

A body 31 is also rotatable on a tile cutter in the same manner as body 21, so that it can be turned to permit the connection portion 32 to be located on either the right or left side of the tile cutter.

The connection portion 32 is disposed protuberantly at one end of the body 31 and is provided with a through hole 33 perpendicular to the longitudinal axis of the body 31. The connection portion 32 is further provided in the front surface thereof with a threaded hole 34.

An arm portion 35 is provided on the side of one end thereof with an insertion projection 36 engageable with the through hole 33 of the connection portion 32. The arm portion 35 has two long sides, each of which is provided with a protruded portion located at a predetermined interval from the insertion projection 36. These two protruded portions have two side surfaces which are parallel to and equidistant from the central longitudinal axis of the arm portion 35. Each of the above-mentioned side surfaces of the two protruded portions forms a datum surface 37 for locating a tile intended to be cut.

A fastening element 38 is engageable with the threaded hole 34 of the connection portion 32 for fixing securely the arm portion 35.

Figure 7:
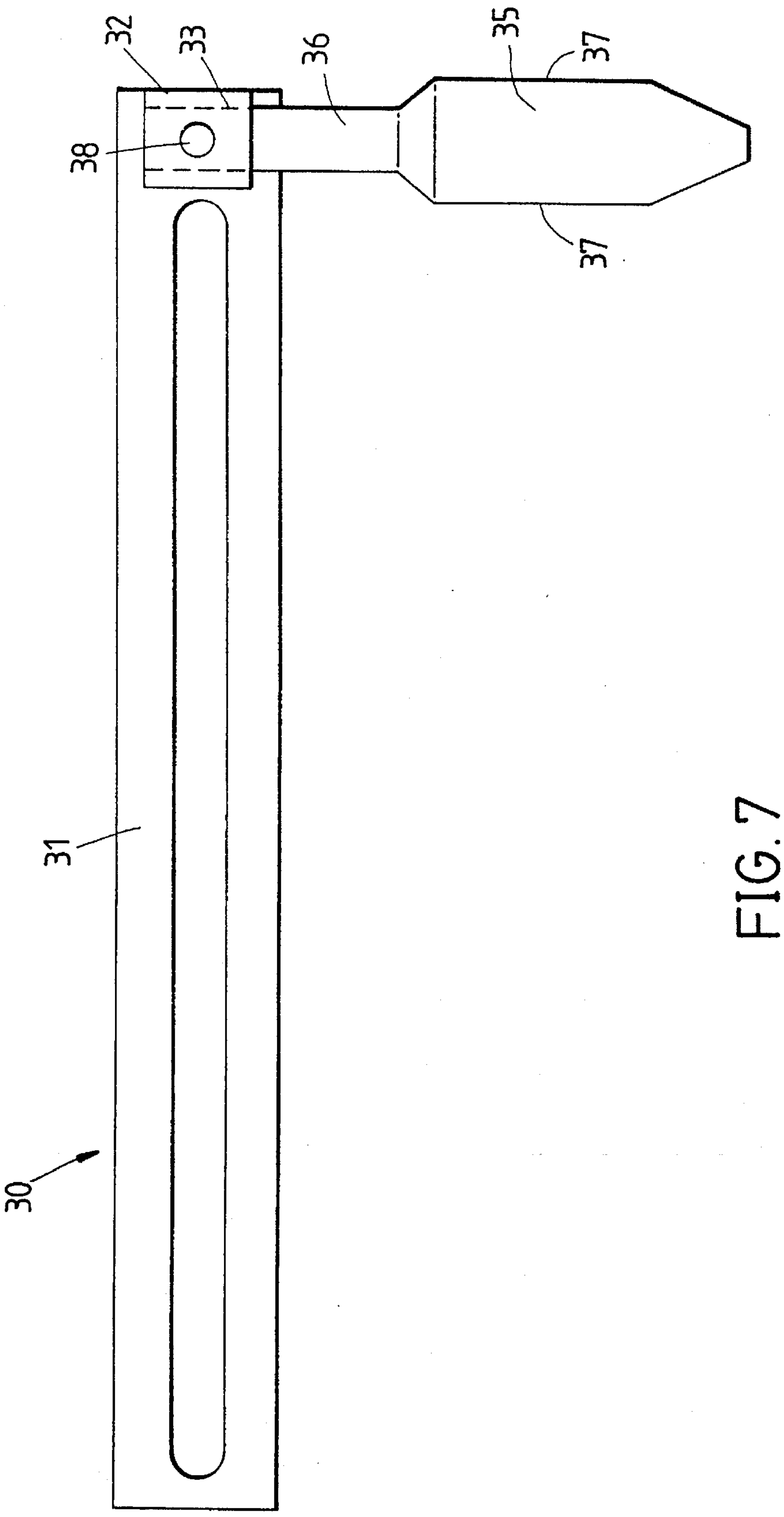
FIG. 7 shows a plan view of the second preferred embodiment in combination, which is provided with an arm portion located at the right according to the present invention.

As shown in FIG. 7, the arm portion 35 is fastened with the right of the body 31 such that the auxiliary rule 30 is suitable for use by a right-hander.

Figure 8:
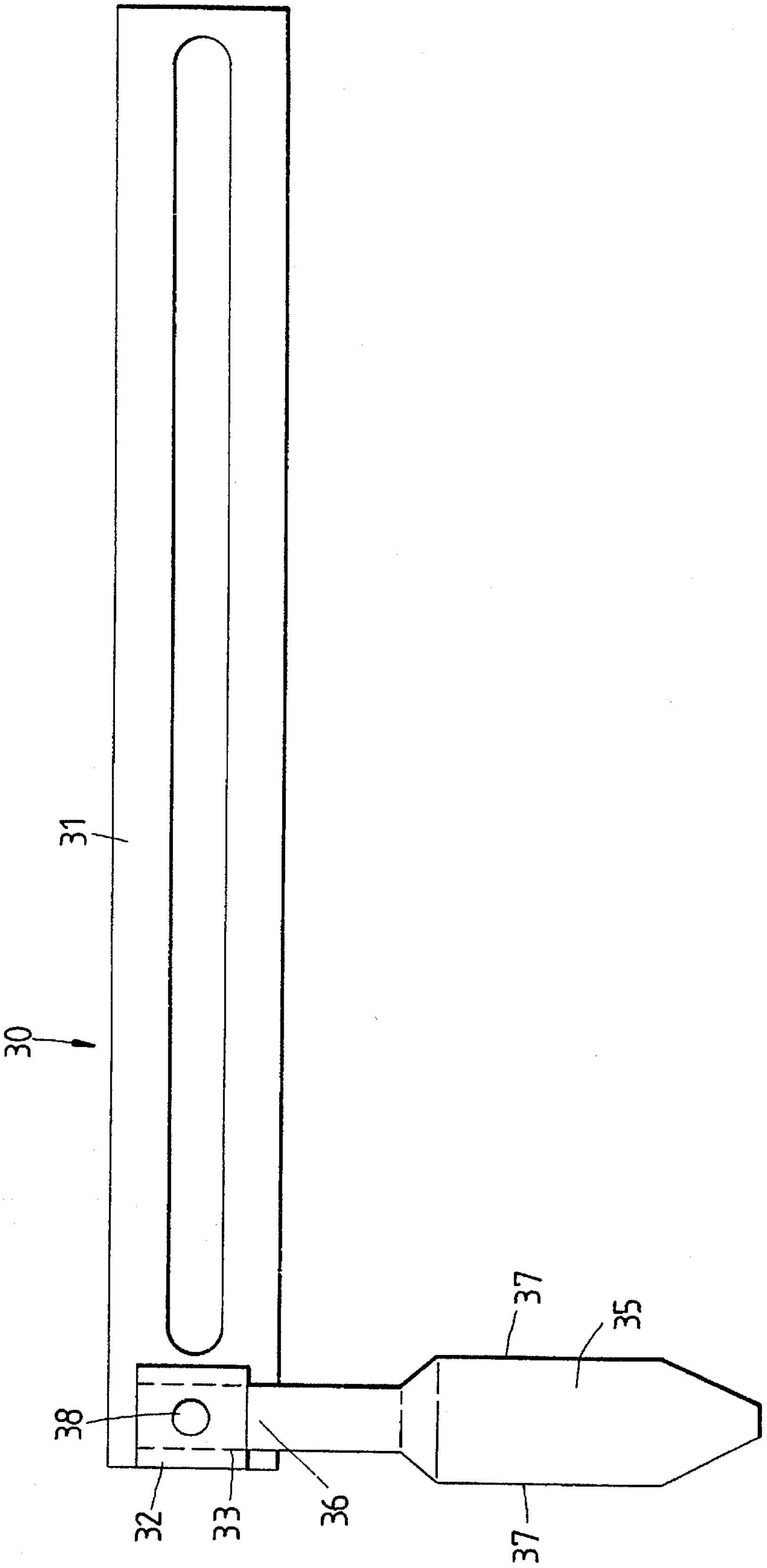
FIG. 8 is similar to FIG. 7, with the exception that the former comprises an arm portion which is located at the left.

As illustrated in FIG. 8, the fastening element 38 is loosened so as to allow the arm portion 35 to be removed. The body 31 is then turned around such that the connection portion 32 is located at the left, as shown in FIG. 8. The removed arm portion 35 is then coupled with the connection portion 32 by the fastening element 38. The auxiliary rule 30 is suitable for use by a left-hander.

Figure 9:
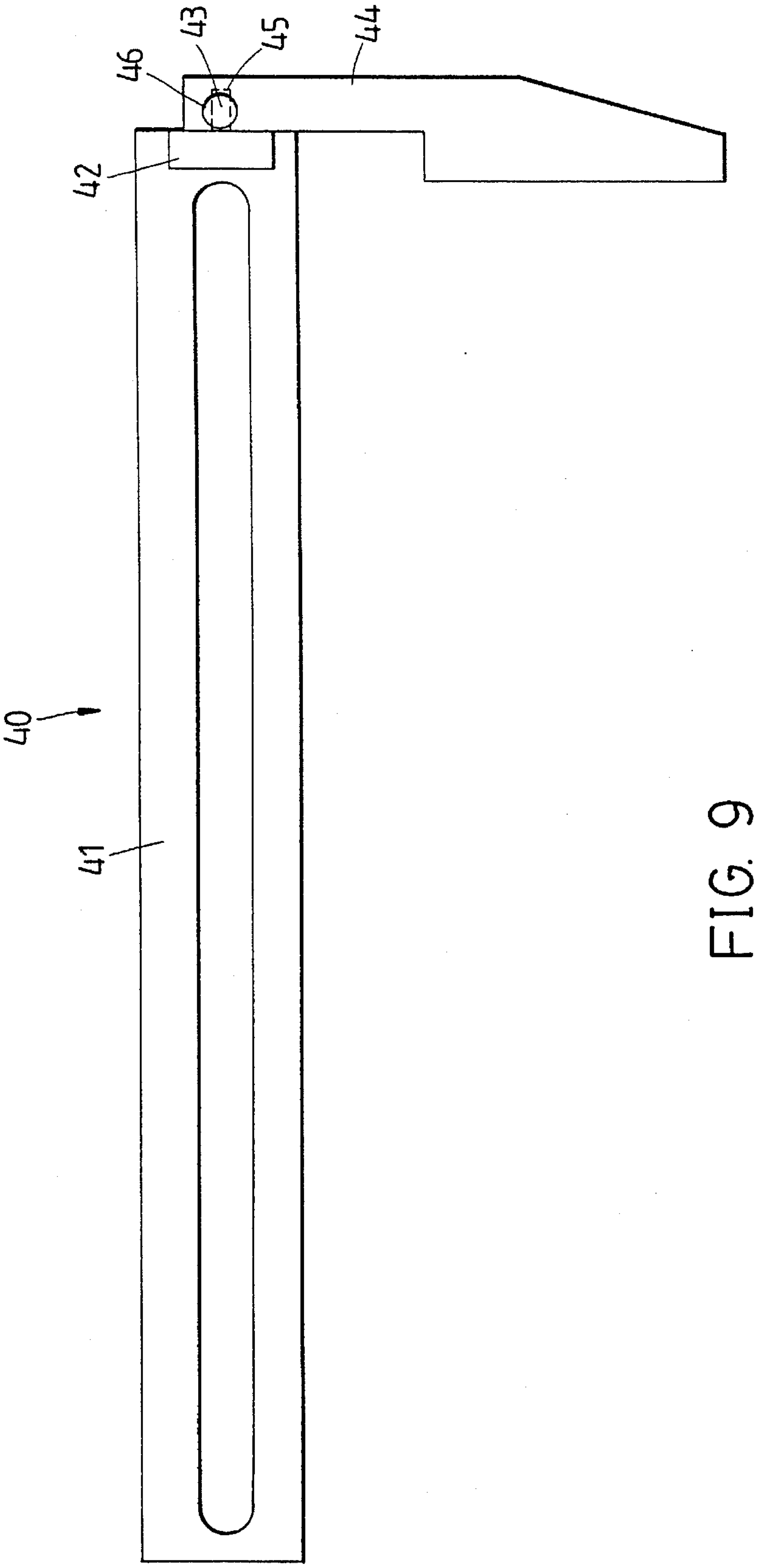
FIG. 9 shows a plan view of a third preferred embodiment of the present invention.

As shown in FIG. 9, an auxiliary rule 40 of the third preferred embodiment of the present invention is similar in construction to that of the first preferred embodiment of the present invention, with the differences being that the former has a connection portion 42 which is provided along the direction of the longitudinal axis of the body 41 with an insertion projection 43, and that the former has an arm portion 44 which is provided with an insertion hole 45 corresponding in location to and engageable with the insertion projection 43, and further that the former has a fastening element 46 which is engageable with the threaded hole of the arm portion.

Figure 10:
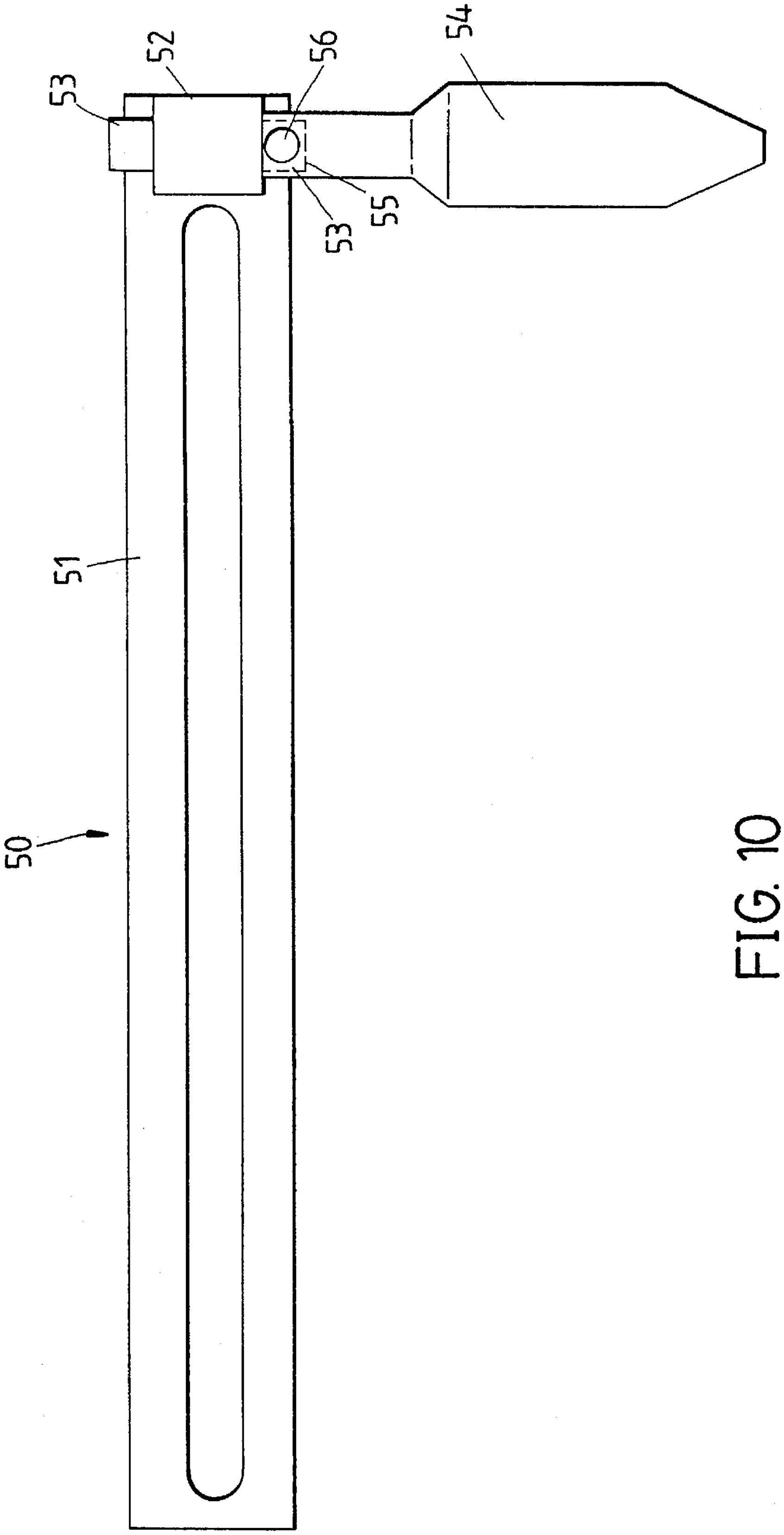
FIG. 10 shows a plan view of a fourth preferred embodiment of the present invention.

As illustrated in FIG. 10, an auxiliary rule 50 of the fourth preferred embodiment of the present invention is similar in construction to that of the second preferred embodiment of the present invention, with the only differences being that the former has a connection portion 52 which is provided respectively on two sides thereof with an insertion projection 53 perpendicular to the longitudinal axis of the body 51, and that the former has an arm portion 54 which is provided at one end thereof with an insertion hole 55 engageable with the insertion projection 53, and further that the former has a fastening element 56 which is engageable with the threaded hole of the arm portion 54.

Figure 11:
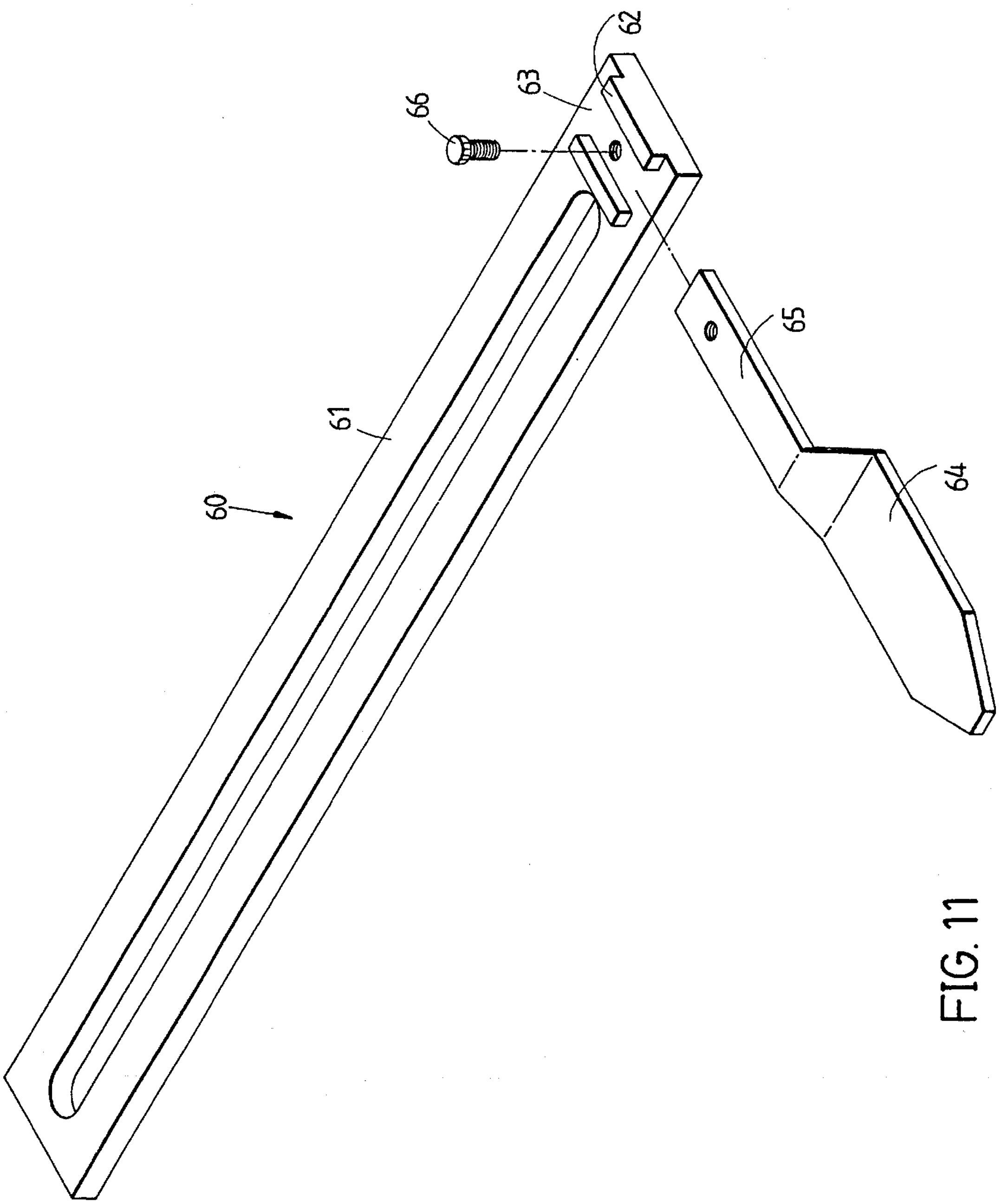
FIG. 11 shows a plan view of a fifth preferred embodiment of the present invention.

As shown in FIG. 11, an auxiliary rule 60 having a body 61 of the fifth preferred embodiment of the present invention is similar in construction to that of the second preferred embodiment of the present invention, with the differences being that the former has a connection portion 62 which is provided with an insertion slot 63, not an insertion hole, and that the former has an arm portion 64 which is provided at one end thereof with an insertion projection 65 corresponding in location to and engageable with the insertion slot 63. The insertion projection 65 can be fastened in the insertion slot 63 by fastening element 66.

As shown in FIG. 5, the body of the auxiliary rule is provided thereon with a scale. In view of the auxiliary rule of the present invention which is so designed as to be turned around to facilitate the use of the auxiliary rule by a left-hander or a right-hander, the body is therefore provided on one long side thereof with an inverted numerical marking.

The insertion projections and the insertion holes of the first and the third preferred embodiments of the present invention may be of a round or square construction, or a polygonal construction. If the insertion projection and the insertion hole are of a round construction, the round insertion projection may be provided thereon with a flat surface to be pressed against by one end of the fastening element.

What is claimed is:

1. An auxiliary rule on a tile cutter, said auxiliary rule having a body provided centrally and axially with a long slot, said body being rotatable on said tile cutter, a connection portion projecting upwards from an upper surface of a first end of said body, an arm portion detachably engaged downward from and perpendicular to a longitudinal axis of said body at the first end of said body, connection means on said connection portion and said arm portion for permitting engagement of said arm portion to said body downward and perpendicular to the longitudinal axis of the body when the connection portion is either on a right side or a left side of the tile cutter, wherein said arm can be positioned on the right side or the left side of the tile cutter to facilitate the use of said auxiliary rule by a left-handed operator or a right-handed operator to cut a tile in the tile cutter.

2. The auxiliary rule according to claim 1 wherein said connection means comprises an insertion projection perpendicular to a longitudinal axis of said arm portion on one side of the arm portion; and an insertion hole on a first end of said connection portion engageable with said insertion projection.

3. The auxiliary rule according to claim 1 wherein said connection means comprises an insertion projection extending along the direction of a longitudinal axis of said connection portion from an end of said connection portion; and an insertion hole perpendicular to a longitudinal axis of the arm portion and engageable with said insertion projection on a side of the arm portion.

4. The auxiliary rule according to claim 1 wherein said connection means comprises an insertion projection on one end of the arm portion extending along the direction of a longitudinal axis of the arm portion; and a through hole perpendicular to a longitudinal axis of said body on said connection portion and engageable with said insertion projection.

5. The auxiliary rule according to claim 1 wherein said connection means comprises an insertion projection respectively on each of two sides of said connection portion perpendicular to a longitudinal axis of said body; and an insertion hole at one end of said arm portion extending along the direction of a longitudinal axis of said arm portion and engageable with a respective one of said insertion projections.

6. The auxiliary rule according to claim 1 wherein said connection means comprises a slot extending through two opposite sides of said connection portion such that said slot is perpendicular to a longitudinal axis of said body and engages an end of said arm portion.

7. The auxiliary rule according to claim 1 wherein said arm portion and said connection portion are coupled with a fastening element.

8. The auxiliary rule according to claim 2 wherein said arm portion has a protruded portion located a predetermined distance from the insertion portion, said protruded portion having a side surface parallel to the longitudinal axis of the arm portion for locating a tile and is parallel to a longitudinal axis of said arm portion.

9. The auxiliary rule according to claim 4 wherein said arm portion is provided on two long sides thereof with two protruded portions which have side surfaces parallel to and equidistant from a central longitudinal axis of said arm portion, each of said side surfaces of said two protruded portions forming a datum surface for locating a tile intended to be cut.

10. An auxiliary rule on a tile cutter, said auxiliary rule having a body provided centrally and axially with a long slot, said body being rotatable on said tile cutter, a connection portion projecting upwards from an upper surface of a first end of said body, an arm portion detachably engaged downward from and perpendicular to a longitudinal axis of said body at the first end of said body, connection means on said connection portion and said arm portion for permitting engagement of said arm portion to said body downward and perpendicular to the longitudinal axis of the body when the connection portion is either on a right side or a left side of the tile cutter, wherein said arm can be positioned on the right side or the left side of the tile cutter to facilitate the use of said auxiliary rule by a left-handed operator or a right-handed operator to cut a tile in the tile cutter, wherein said connection means comprises said arm portion provided on one side thereof with an insertion projection perpendicular to a longitudinal axis of said arm portion; and wherein said connection portion is provided in one end thereof with an insertion hole engageable with said insertion projection;

wherein said arm portion and said connection portion are coupled with a fastening element;

wherein said arm portion has a protruded portion located a predetermined distance from the insertion portion, said protruded portion having a side surface parallel to the longitudinal axis of the arm portion for locating a tile in the tile cutter and is parallel to a longitudinal axis of said arm portion.

* * * * *